(12) United States Patent
Limmer et al.

(10) Patent No.: US 8,054,584 B2
(45) Date of Patent: Nov. 8, 2011

(54) TOP BOND PAD BIAS AND VARIATION CONTROL

(75) Inventors: Joel David Limmer, Bloomington, MN (US); Bradley Jay Ver Meer, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 505 days.

(21) Appl. No.: 12/324,503

(22) Filed: Nov. 26, 2008

(65) Prior Publication Data

US 2010/0128394 A1    May 27, 2010

(51) Int. Cl.
*G11B 5/60* (2006.01)
*G11B 21/21* (2006.01)

(52) U.S. Cl. ............... 360/234.5; 360/234.6; 360/234.7

(58) Field of Classification Search ............... 360/234.5, 360/234.6, 234.7
See application file for complete search history.

(56) References Cited

U.S. PATENT DOCUMENTS

| | | | |
|---|---|---|---|
| 4,761,699 A * | 8/1988 | Ainslie et al. ............... | 360/234.5 |
| 4,789,914 A | 12/1988 | Ainslie et al. | |
| 5,650,595 A * | 7/1997 | Bentlage et al. ............. | 174/260 |
| 5,680,275 A * | 10/1997 | Frater et al. ................ | 360/234.5 |
| 5,717,547 A | 2/1998 | Young | |
| 5,734,524 A * | 3/1998 | Ruiz ............................ | 360/234 |
| 5,737,152 A | 4/1998 | Balakrishnan | |
| 5,781,379 A * | 7/1998 | Erpelding et al. .......... | 360/245.3 |
| 5,821,494 A * | 10/1998 | Albrecht et al. .......... | 219/121.64 |
| 5,847,902 A * | 12/1998 | Clifford et al. ............ | 360/245.6 |
| 5,896,248 A | 4/1999 | Hanrahan et al. | |
| 5,914,834 A | 6/1999 | Gustafson | |
| 5,956,209 A * | 9/1999 | Shum .......................... | 360/244.3 |
| 5,982,583 A | 11/1999 | Strom | |
| 5,995,328 A | 11/1999 | Balakrishnan | |
| 6,038,102 A | 3/2000 | Balakrishnan et al. | |
| 6,078,473 A | 6/2000 | Crane et al. | |
| 6,134,770 A * | 10/2000 | Heeren et al. .............. | 29/603.03 |
| 6,233,117 B1 | 5/2001 | Rancour et al. | |
| 6,313,972 B1 * | 11/2001 | Williams et al. ........... | 360/245.3 |
| 6,351,353 B1 | 2/2002 | Sluzewski et al. | |
| 6,430,047 B2 | 8/2002 | Wentzel et al. | |
| 6,747,845 B1 | 6/2004 | Baglin et al. | |
| 6,871,392 B2 * | 3/2005 | Tsuchiya et al. ........... | 29/603.03 |
| 6,879,465 B2 * | 4/2005 | Tsuchiya et al. ........... | 360/245.4 |
| 6,940,697 B2 | 9/2005 | Jang et al. | |
| 6,985,332 B1 * | 1/2006 | Sluzewski et al. ......... | 360/234.5 |
| 7,161,766 B2 * | 1/2007 | Kidachi et al. ............. | 360/245.2 |
| 7,292,248 B2 * | 11/2007 | Mellema ...................... | 345/467 |
| 7,538,984 B2 * | 5/2009 | Yao .............................. | 360/294.4 |
| 7,583,475 B2 * | 9/2009 | Matsumoto et al. ....... | 360/245.9 |
| 2006/0274452 A1 | 12/2006 | Arya | |
| 2007/0111645 A1 | 5/2007 | Hu et al. | |
| 2007/0274005 A1 | 11/2007 | Zhu et al. | |

* cited by examiner

*Primary Examiner* — Viet Nguyen
(74) *Attorney, Agent, or Firm* — Fredrikson & Byron, P.A.

(57) ABSTRACT

An assembly includes a slider and a suspension assembly. The slider includes an air bearing surface and a slider mounting surface opposite the air bearing surface. There are a plurality of slider pads on the slider mounting surface. The suspension assembly includes a plurality of suspension pads on a suspension mounting surface. Each of the suspension pads is connected to one of the slider pads with a solder joint so that the slider mounting surface has at least one of a pitch, roll, or yaw angle with respect to the suspension mounting.

31 Claims, 4 Drawing Sheets

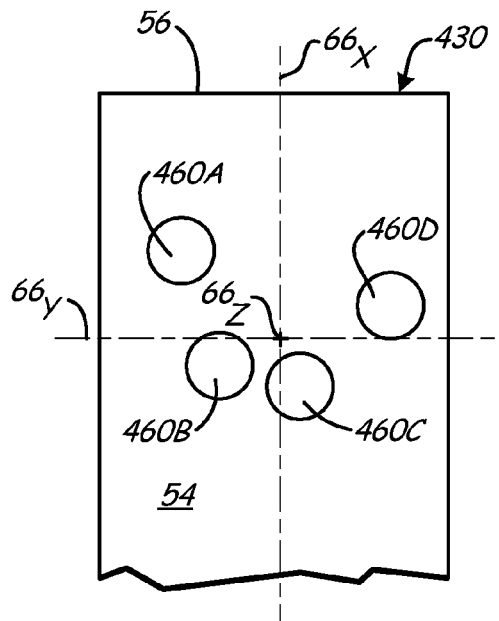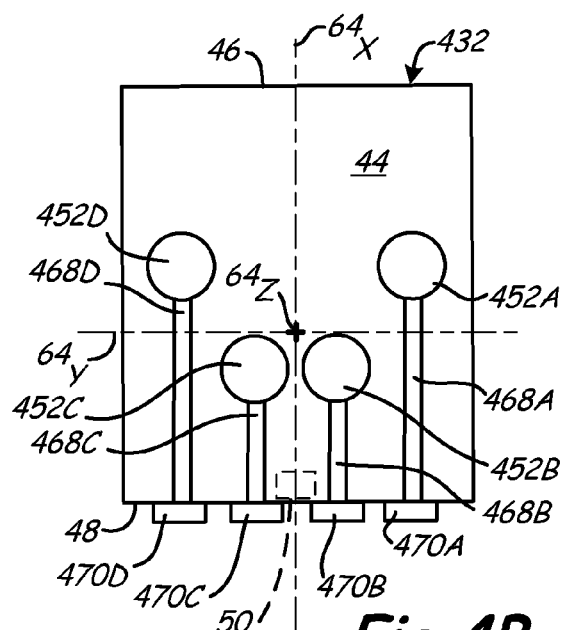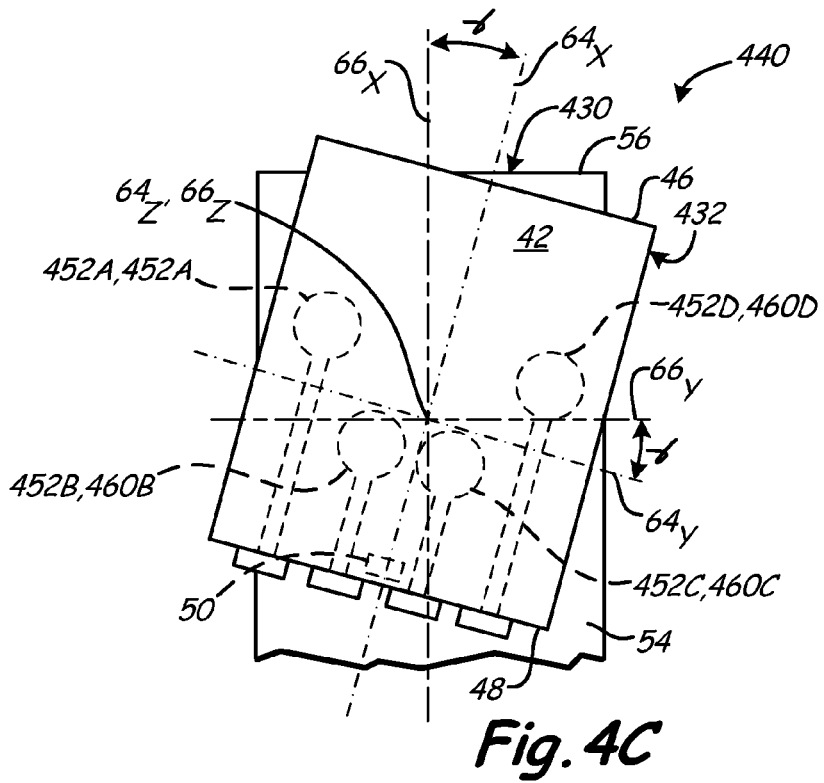
Fig. 4A
Fig. 4B
Fig. 4C

TOP BOND PAD BIAS AND VARIATION CONTROL

BACKGROUND

The present invention relates to hard disc drive (HDD) slider connections, and more particularly, to solder connections with top bond pads on a slider.

HDDs typically comprise one or more discs. Where multiple discs are used, a stack is formed of co-axial discs having generally the same diameter. A transducing head carried by a slider is used to read from and write to a data track on a disc. The slider is carried by an arm assembly that includes an actuator arm and a suspension assembly, which can include a separate gimbal structure or can integrally form a gimbal. The slider is typically attached directly to the gimbal with an adhesive. As the disc is spun, the slider glides above the surface of the disc on a small cushion of air usually referred to as an air bearing. Any necessary adjustment in slider orientation is typically obtained by physically bending the gimbal during assembly. The actuator arm movably positions the slider with respect to the disc. Electrical connections extend along the suspension to electrically connect the transducing head to components located at or near the actuator arm. Those electrical connections can be formed on the suspension itself, or can be located on a separate interconnect structure supported relative to the suspension, such as a flex-on suspension (FOS).

SUMMARY

According to the present invention, an assembly includes a slider and a suspension assembly. The slider includes an air bearing surface and a slider mounting surface opposite the air bearing surface. There are a plurality of slider pads on the slider mounting surface. The suspension assembly includes a plurality of suspension pads on a suspension mounting surface. Each of the suspension pads is connected to one of the slider pads with a solder joint so that the slider mounting surface has at least one of a pitch, roll, or yaw angle with respect to the suspension mounting.

BRIEF DESCRIPTION OF THE DRAWINGS

FIG. 4A is a bottom view of a suspension assembly according to another embodiment.

FIG. 4B is a top view of a slider according to the embodiment of FIG. 4A.

FIG. 4C is a bottom view of a slider mounting assembly according to the embodiment of FIGS. 4A and 4B.

DETAILED DESCRIPTION

In general, the present invention provides a slider with top bond pads for mounting to corresponding bond pads on a suspension. The size, shape, and location of certain bond pads can be varied to control pitch, roll, and yaw of the slider with respect to the suspension, and consequently, with respect to a disc of a hard disc drive (HDD). The amount of solder and method of applying the solder to particular bond pads can also be used to control pitch, roll, and yaw of the slider.

Figure 1:
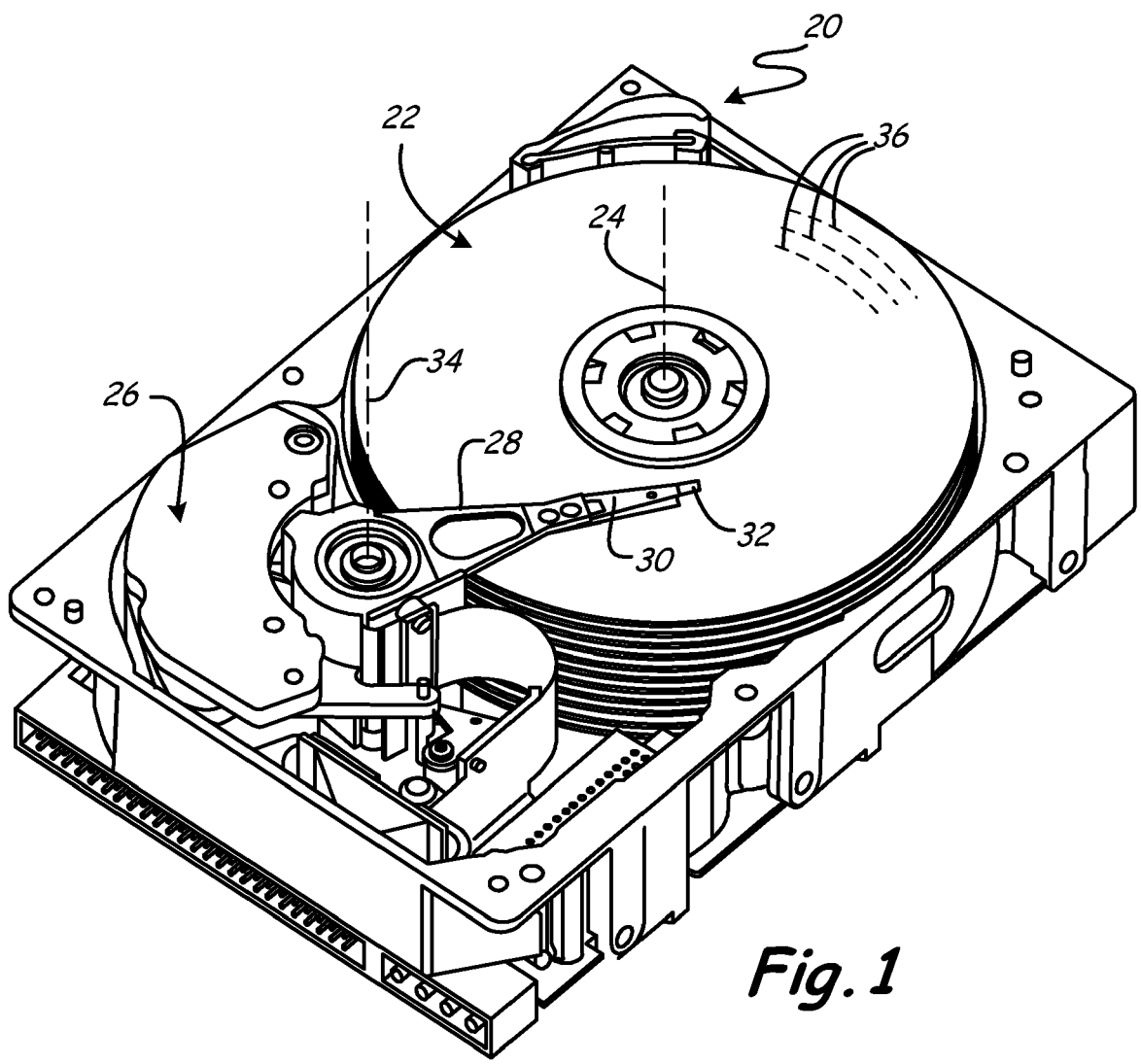
FIG. 1 is a perspective view of a hard disc drive system.

FIG. 1 is a perspective view of exemplary HDD system 20 that includes magnetic storage disc 22 configured to rotate about axis 24, actuation motor 26 (e.g., a voice coil motor), actuator arm 28, suspension assembly 30, and slider 32 carrying a transducing head. Slider 32 is supported by suspension assembly 30, which in turn is supported by actuator arm 28. Actuation (voice coil) motor 26 is configured to pivot actuator arm 28 about axis 34, in order to sweep suspension 30 and slider 32 in an arc across a surface of rotating disc 22 with slider 32 "flying" above disc 22 on a cushion or air. An additional microactuation system can be provided for producing precise, small-scale movements of suspension 30 and slider 32. The transducing head carried by slider 32 can be positioned relative to selected areas of disc 22, for reading from and writing to disc 22. It should be noted that a stack of co-rotating discs 22 can be provided, with additional actuator arms 28, suspension assemblies 30, and sliders 32 carrying transducing heads for reading and writing at top and bottom surfaces of each disc 22 in the stack.

Figure 2:
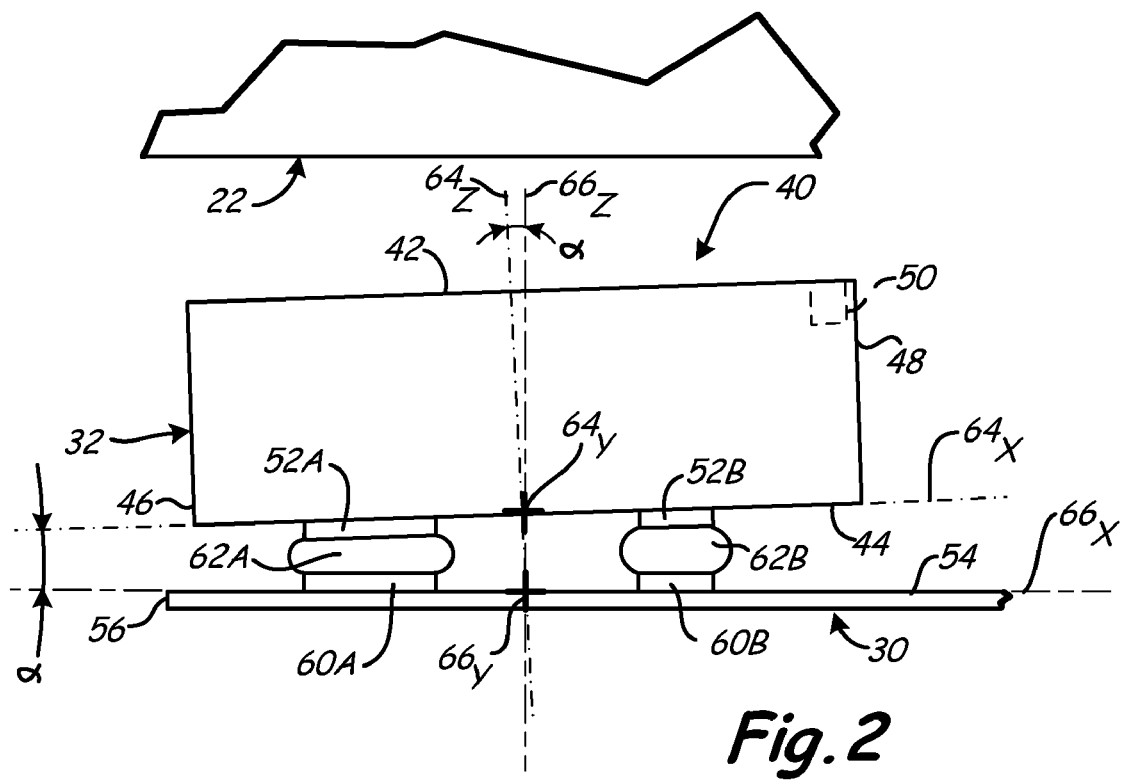
FIG. 2 is a side view of a slider mounting assembly according to an embodiment of the present invention.

FIG. 2 is a side view of slider mounting assembly 40 according to a first embodiment. Slider mounting assembly 40 includes: slider 32, which includes air bearing surface 42, slider mounting surface 44, leading edge 46, trailing edge 48, transducer 50, and slider pads 52A and 52B; and suspension assembly 30, which includes suspension mounting surface 54, edge 56, and suspension pads 60A and 60B.

Slider 32 is configured to glide on a cushion of air between air bearing surface 42 and disc 22 as disc 22 rotates at relatively high speeds. Slider 32 can be shaped like a rectangular box, with substantially planar surfaces. Slider mounting surface 44 is aligned opposite air bearing surface 42 and supports slider pads 52A and 52B. Leading edge 46 and trailing edge 48 each extend between air bearing surface 42 and slider mounting surface 44. Trailing edge 48 is located opposite of leading edge 46. Transducer 50 is supported at or near trailing edge 48 in a position configured to read from and write to disc 22. Slider mounting surface 44 is also known in the industry as a "back" surface or a "top" surface because of its orientation with respect to disc 22 (i.e. facing away from disc 22) when installed in a HDD.

Suspension assembly 30 is configured to mechanically connect slider 32 to suspension 30 and ultimately to actuator arm 28 (see FIG. 1) and electrically connect slider 32 to control and signal processing circuitry (not shown). Suspension mounting surface 54 is a relatively flat surface including suspension pads 60A and 60B. Suspension mounting surface 54 can be planar. Suspension pads 60A and 60B can be attached directly to suspension assembly 30 or can be attached to a flex circuit (not shown) that is supported adjacent to suspension assembly 30. In one embodiment, suspension mounting surface 54 is a disc-facing surface of a gimbal. Edge 56 can be arranged to face actuator arm 28 (see FIG. 1).

In FIG. 2, slider pad 52A and suspension pad 60A are both circular pads each having a first surface area on a side facing each other. Slider pad 52B and suspension pad 60B are both circular pads each having a second surface area, on a side facing each other, that is smaller than the first surface area. Solder connection 62A connects slider pad 52A to suspension pad 60A, and solder connection 62B connects slider pad 52B to suspension pad 60B. Solder connection 62A has approximately a same volume of solder as solder connection 62B.

Generally, when solder is placed between two bond pads facing each other and reflowed (i.e. liquefied), the solder tends to "wick" to cover an entire exposed surface of each bond pad. Surface tension of the solder tends to hold the solder together and either push the bond pads apart or pull the bond pads together, depending on the geometry of the solder connection after wicking. Surface tension effects for a reflowed solder connection bias each solder connection toward a state of lowest energy. Consequently, a quantity of solder between two relatively large bond pads will spread over a large area, creating a wide and thin solder connection such as solder connection 62A. Conversely, the same quantity of solder between two relatively small bond pads will spread over a smaller area, creating a smaller diameter and thicker solder connection such as solder connection 62B. Thus, solder connection 62B pushes slider mounting surface 44 further away from suspension mounting surface 54 than solder connection 62A does. Under these circumstances, it can be said that distance between a coupled pair of bond pads (i.e. slider pad 52A and suspension pad 60A) is an inverse function of the size of the bonding surface area of the couple pair of bond pads. Thus, varying the size of bond pads can cause slider mounting surface 44 to be angled with respect to suspension mounting surface 54.

Alignment of slider 32 can be described with reference to two Cartesian coordinate systems: slider grid 64 and suspension grid 66. Slider grid 64 is defined with respect to slider mounting surface 44 by three orthogonal axes: axis 64x, axis 64y, and axis 64z. Axis 64x is defined along slider mounting surface 44, substantially bisecting slider mounting surface 44, and perpendicular to planes of both leading edge 46 and trailing edge 48. Axis 64y is defined along slider mounting surface 44, substantially bisecting slider mounting surface 44, and perpendicular to axis 64x. Axis 64z extends from an intersection between axis 64y and axis 64x, perpendicular to both axis 64y and axis 64x. Suspension grid 66 is defined with respect to suspension mounting surface 54 by three orthogonal axes: axis 66y, axis 66z, and axis 66x. Axis 66x is defined along suspension mounting surface 54, substantially bisecting suspension mounting surface 54, extending along a length of suspension mounting surface 54, and perpendicular to edge 56. Axis 66y is defined along suspension mounting surface 54, perpendicular to axis 66x, and approximately equidistant from leading edge 46 and trailing edge 48. Axis 66z extends from an intersection between axis 66y and axis 66x, perpendicular to both axis 66y and axis 66x. As illustrated in FIG. 2, grid 64 is rotated with respect to grid 66 about axis 64y so that axis 64x and axis 66x form pitch angle α. Similarly, axis 64z and axis 66z form the same pitch angle α.

The performance of an HDD system can benefit from gliding (or flying) the slider relatively close to the disc, so that the write/read transducer is positioned as close as possible to the storage media on the disc. This allows smaller bit size and higher areal bit density. As the fly height is reduced, the orientation of the slider (yaw, roll, and pitch) is important to achieving proper flying characteristics at the desired fly height.

Slider 32 can be have a shape aerodynamically configured to reduce fly height of slider 32 with respect to disc 22 as disc 22 spins. The fly height of slider 32 can depend, in part, not only on the shape of slider 32, but also on an angle of slider 32 with respect to disc 22. In prior art suspension mounting assemblies, a slider is typically bonded directly to a tongue of a gimbal. In order to adjust an angle of the slider with respect to a disc, the gimbal tongue is physically deformed. This technique creates several problems. First, it creates an extra step in a manufacturing process, thus increasing cost. Second, deforming the gimbal tongue can stiffen material properties of the gimbal, thus reducing gimbal flexibility. Third, bending the gimbal to create a desired slider pitch angle can simultaneously create an undesired change in slider fly height, thus negatively altering performance.

Suspension mounting assembly 40 as illustrated in FIG. 2 allows for control of slider pitch angle by adjusting size of bond pads without deforming a gimbal. Size of slider pads 52A and 52B can be increased or decreased as desired to create a particular pitch angle α. Given a known shape of suspension assembly 30 and slider 32, creation of a particular pitch angle α creates a correspondingly controllable angle between air bearing surface 42 and disc 22. Using this technique, pitch angle α can be repeatably created with a value between about 0.5 degrees and 5 degrees. In certain embodiments, pitch angle α is between about 0.5 degrees and 3 degrees. In another embodiment, pitch angle α is about 0.5 degrees and 1 degree. In certain embodiments, slider pitch angle can be controlled using this technique with a greater number of bond pads.

Figure 3:
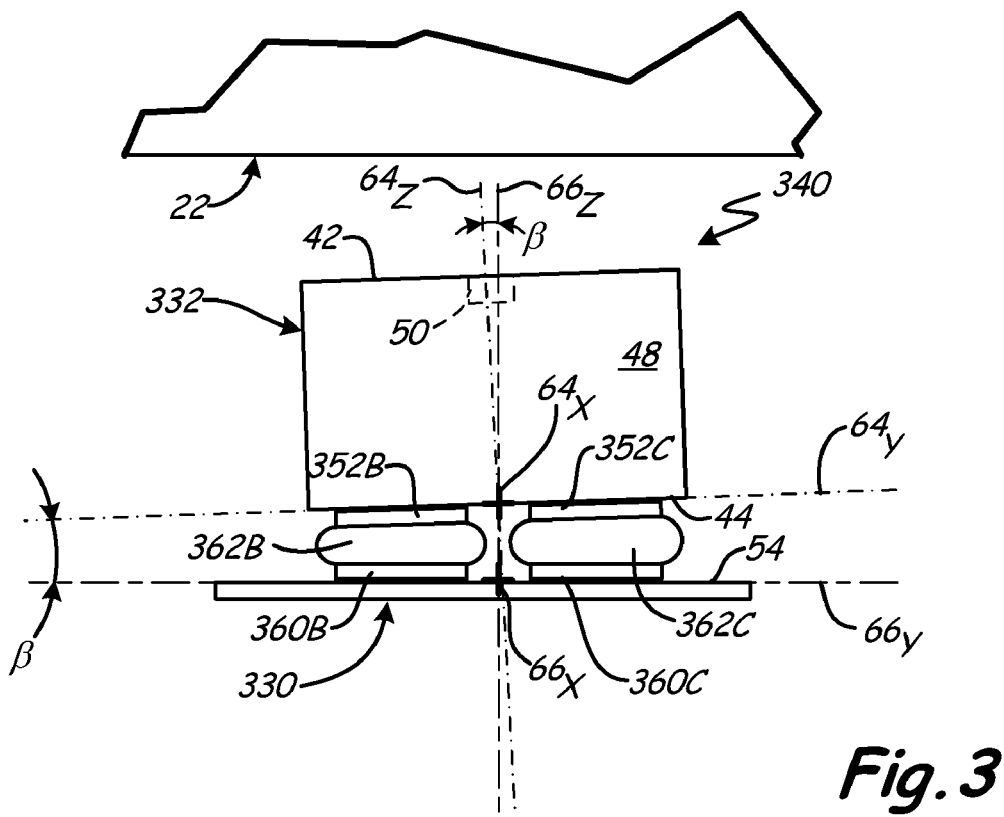
FIG. 3 is an end view of a slider mounting assembly according to another embodiment.

FIG. 3 is an end view of slider mounting assembly 340 according to a second embodiment. Slider mounting assembly 340 includes slider 332 and suspension assembly 330. Slider 332 is similar to slider 32 of FIG. 2 except for slider pads. Slider 332 includes slider pads 352B and 352C, which have a substantially identical surface area on sides facing suspension pads 360B and 360C. Suspension assembly 330 is similar to suspension assembly 30 of FIG. 2 except for suspension pads. Suspension assembly 330 includes suspension pads 360B and 360C, which also have substantially the same surface area as slider pads 352B and 352C on sides facing slider pads 352B and 352C. Solder connection 362B connects slider pad 352B to suspension pad 360B, and solder connection 362C connects slider pad 352C to suspension pad 360C. Each of solder connections 362B and 362C starts as a solid solder ball placed between their respective solder pads, and subsequently reflowed. Solder connection 362C has a greater volume than solder connection 362B because the original solder ball is intentionally chosen to have a greater volume. Since both solder connections 362B and 362C wick over bond pads of substantially the same surface area, solder connection 362C will be thicker than solder connection 362B. Therefore, imbalance in solder connection thickness skews slider mounting surface 44 to form an angle with suspension mounting surface 54. As illustrated in FIG. 3, grid 64 is rotated with respect to grid 66 about axis 64x so that axis 64y and axis 66y form roll angle β. Similarly, axis 64z and axis 66z form the same roll angle β.

Suspension mounting assembly 340 as illustrated in FIG. 3 allows for control of slider roll angle by adjusting volume of solder connections. The volume of solder connections 362B and 362C can be increased or decreased as desired to create a particular roll angle β. Given a known shape of suspension assembly 330 and slider 332, creation of a particular roll angle β creates a correspondingly controllable angle between air bearing surface 42 and disc 22. Using this technique, roll angle β can be repeatably created with a value between about 0.5 degrees and 5 degrees. In certain embodiments, roll angle β is between about 0.5 degrees and 3 degrees. In another embodiment, roll angle β is between about 0.5 degrees and 1 degree.

FIG. 2 shows pitch angle α created by a difference in bond pad size, but in other embodiments, the volume of solder connections can be increased or decreased as desired to create a particular pitch angle α. Similarly, FIG. 3 creates roll angle β by a difference in solder volume, but in other embodiments the size of bond pads can be increased or decreased as desired to create a particular roll angle β. In other embodiments, size of bond pads and volume of solder connections can both be varied. The combination of these variables can create a slider mounting assembly with a predictable angle between a slider mounting surface and a suspension mounting surface of between about 0.5 degrees and 5 degrees. Pitch and roll can be controlled simultaneously.

FIGS. 4A-4C illustrate another embodiment of the present invention. The third embodiment can also be described with reference to slider grid 64 and suspension grid 66, as described with reference to FIG. 2. FIG. 4A is a bottom view of suspension assembly 430 according to the third embodiment. Suspension assembly 430 is similar to suspension mounting surface 30 of FIG. 2 except for suspension pads. Suspension assembly 430 includes suspension pads 460A, 460B, 460C, and 460D located on suspension mounting surface 54.

FIG. 4B is a top view of slider 432 according to the third embodiment of the invention. Slider 432 is similar to slider 32 of FIG. 2 except for slider pads 452A, 452B, 452C, and 452D, slider traces 468A, 468B, 468C, and 468D, and trailing edge pads 470A, 470B, 470C, and 470D. Slider traces 468A, 468B, 468C, and 468D electrically connect slider pads 452A, 452B, 452C, and 452D on slider mounting surface 44 to trailing edge pads 470A, 470B, 470C, and 470D on trailing edge 48 and to transducer 50 through an overcoat layer of slider 432.

FIG. 4C is a bottom view of slider mounting assembly 440 according to the third embodiment of the invention. Slider mounting assembly 440 includes slider 432 attached to suspension assembly 430, with slider pads 452A, 452B, 452C, and 452D connected with solder to each of suspension pads 460A, 460B, 460C, and 460D, respectively.

Slider pads 452A, 452B, 452C, and 452D are mounted on slider mounting surface 44 in an array (see FIG. 4B) that is an approximate mirror image of an array of suspension pads 460A, 460B, 460C, and 460D attached to suspension mounting surface 54 (see FIG. 4A), except the array of slider pads 452A, 452B, 452C, and 452D is rotated about axis 64z by angle γ (see FIG. 4C). Consequently, slider 432 is also rotated with respect to suspension assembly 430 when mounted so that axis 66x and axis 64x form yaw angle γ. Similarly, axis 66y and axis 64y also form yaw angle γ.

Solder surface tension effects bias solder connections toward a lowest energy state as described above. Because the array of slider pads 452A, 452B, 452C, and 452D is an approximate mirror image of the array of suspension pads 460A, 460B, 460C, and 460D, solder surface tension will tend to bias slider mounting assembly 440 in a manner such that each of slider pads 452A, 452B, 452C, and 452D will be approximately directly opposite of each of suspension pads 460A, 460B, 460C, and 460D, respectively. This can be helpful during assembly. For example, slider 432 can be placed on suspension assembly 430 with an orientation that is close to, but not exactly a desired orientation. Solder surface tension effects will tend to move slider 432 toward the desired orientation with a yaw angle γ. Thus, mounting skewed pads on either a slider mounting surface or a suspension mounting surface can create a relatively repeatable yaw angle. This technique can be used to create acute yaw angles greater than approximately 0.5 degrees. In certain embodiments, yaw angle γ can be between about 0.5 degrees and about 20 degrees. In another embodiment, yaw angle γ can be between about 1 degree and about 10 degrees. In still another embodiment, yaw angle γ is between about 3 degrees and about 10 degrees.

Figure 5A:
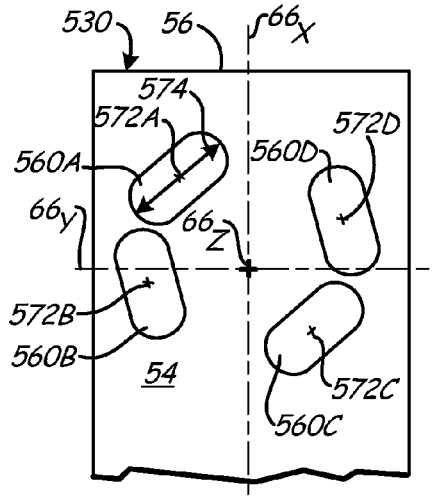
FIG. 5A is a bottom view of a suspension assembly according to another embodiment.

FIGS. 5A-5D illustrate another embodiment of the present invention. The fourth embodiment can also be described with reference to slider grid 64 and suspension grid 66, as described with reference to FIG. 2. FIG. 5A is a bottom view of suspension assembly 530 according to the fourth embodiment of the invention. Suspension assembly 530 is similar to suspension mounting surface 430 of FIG. 4A except for suspension pads. Suspension assembly 530 includes suspension pads 560A, 560B, 560C, and 560D attached to suspension mounting surface 54. In the illustrated embodiment, suspension pads 560A, 560B, 560C, and 560D are elongated pads, each having suspension pad center points 572A, 572B, 572C, and 572D, respectively. Suspension pad 560A is shaped substantially as a rectangle having two parallel long edges, with each of the short rectangular edges replaced by a semicircle having a diameter equal to a distance between each of the long rectangular edges. Suspension pad 560A has a suspension pad length 574 in its longest dimension, measured between midpoints of each semicircle arc. Suspension pad center point 572A is equally distant from midpoints of each semicircle arc and also equally distant from midpoints of each long edge. In the illustrated embodiment, each of suspension pads 560B, 560C, and 560D are shaped similar to suspension pad 560A but have orientations that are rotated with respect to axis 66z.

Figure 5B:
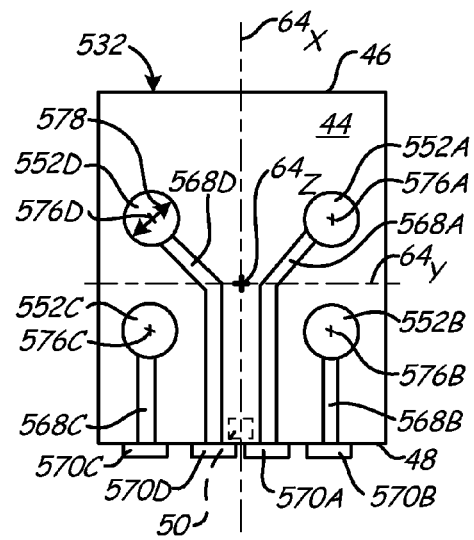
FIG. 5B is a top view of a slider according to the embodiment of FIG. 5A.

FIG. 5B is a top view of slider 532 according to the fourth embodiment of the invention. Slider 532 is similar to slider 432 of FIG. 4 except for slider pads 552A, 552B, 552C, and 552D and slider traces 568A, 568B, 568C, and 568D. Slider traces 568A, 568B, 568C, and 568D electrically connect slider pads 552A, 552B, 552C, and 552D on slider mounting surface 44 to trailing edge pads 570A, 570B, 570C, and 570D on trailing edge 48 and to transducer 50 through an overcoat layer of slider 532. Slider pads 552A, 552B, 552C, and 552D are substantially circular pads, each having slider pad center points 576A, 576B, 576C, and 576D, respectively. Slider pad 552D has a slider pad diameter (or length) 578. Slider pad diameter 578 is less than suspension pad length 574. In the illustrated embodiment, each of slider pads 552A, 552B, and 552C are shaped similar to slider pad 552D.

Figure 5C:
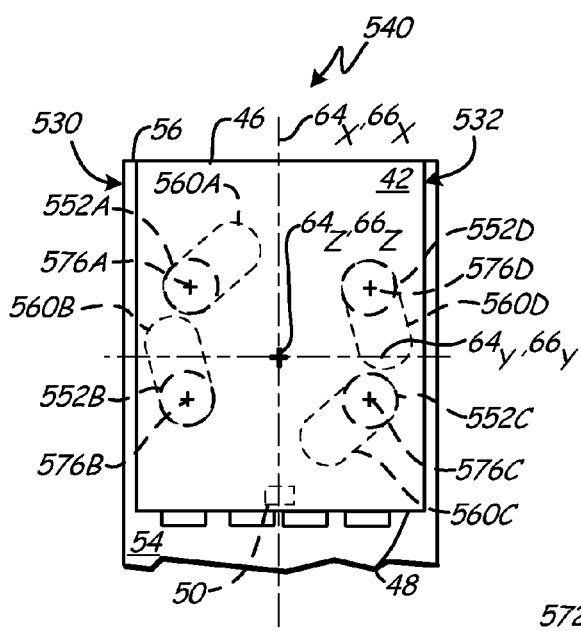
FIG. 5C is a bottom view of a slider mounting assembly in a first position.

FIG. 5C is a bottom view of slider mounting assembly 540 in a first position according to the fourth embodiment of the invention. Slider mounting assembly 540 includes slider 532 aligned with suspension assembly 530 so that axis 64z is substantially collinearly aligned with axis 66z, axis 64y is substantially parallel with axis 66y, and axis 64x is substantially parallel with axis 66x. Each of slider pads 552A, 552B, 552C, and 552D are aligned to be opposite a portion of each of each of suspension pads 560A, 560B, 560C, and 560D, respectively. Slider pad center points 576A, 576B, 576C, and 576D are each positioned near, but not directly opposite of, each of suspension pad center points 572A, 572B, 572C, and 572D (not shown in FIG. 5C), respectively.

Slider mounting assembly 540 can be oriented in the first position during, but prior to completion of, assembly of slider mounting assembly 540. When slider mounting assembly 540 is oriented in the first position, solder balls (not shown) are placed between each of the slider pads and the corresponding suspension pads. Heat is applied to the solder balls and reflows (i.e. liquefies) the solder balls. Each solder ball then bonds to its corresponding solder pad and suspension pad to form a solder connection. For example, one solder ball can bond to slider pad 552A and to suspension pad 560A. Because of the properties of solder surface tension, described above, the solder ball bonds to substantially an entire surface of each of slider pad 552A and to suspension pad 560A. Since slider pad center point 576A is not directly opposite of suspension pad center point 572A, the solder connection is asymmetrical. This causes surface tension of the solder connection to tend to pull slider pad center point 576A and suspension pad center point 572A closer together prior to, and as, the solder solidifies.

Figure 5D:
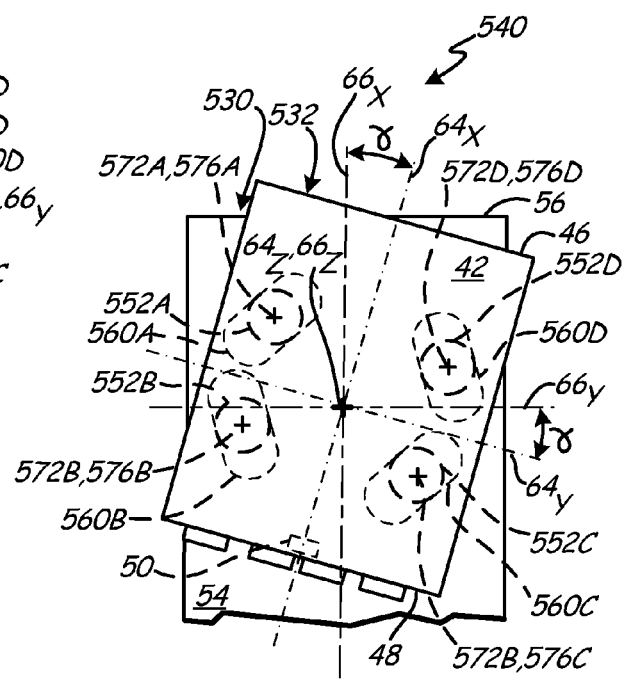
FIG. 5D is a bottom view of a slider mounting assembly in a second position.

FIG. 5D is a bottom view of slider mounting assembly 540 in a second position according to the fourth embodiment of the invention. In the second position, slider 532 is aligned with suspension assembly 530 so that slider pad center points 576A, 576B, 576C, and 576D are each aligned approximately directly opposite of each of suspension pad center points 572A, 572B, 572C, and 572D, respectively. Slider mounting assembly 540 is approximately in the second position when the liquefied solder connections reach a lowest total surface tension energy. Solder connections can then solidify so that axis 66$x$ and axis 64$x$ form yaw angle $\gamma$. Similarly, axis 66$y$ and axis 64$y$ also form yaw angle $\gamma$.

Using the assembly and method described with respect to FIGS. 5A, 5B, 5C, and 5D, a slider mounting assembly can be assembled by placing a slider on a suspension assembly in a first position, placing and heating solder between slider pads and suspension pads, allowing surface tension to move the slider to a second position, and cooling the solder when the slider is in the second position. Using suspension pads that are longer than corresponding slider pads place the slider on the suspension assembly at that particular angle during manufacturing. This technique can be used to create acute yaw angles greater than approximately 0.5 degrees. In certain embodiments, yaw angle $\gamma$ can be between about 0.5 degrees and about 20 degrees. In another embodiment, yaw angle $\gamma$ can be between about 1 degree and about 10 degrees. In still another embodiment, yaw angle $\gamma$ is between about 3 degrees and about 10 degrees.

In other embodiments, slider pads and suspension pads can be virtually any shape and size that is conducive to placing a slider on a suspension assembly in a first angular position and allowing solder surface tension to move the slider to a second, angled position as described above. For example, suspension pads 560A, 560B, 560C, and 560D could be small circular pads and slider pads 552A, 552B, 552C, and 552D could be longer, elongated pads. In yet another embodiment, slider 532 can be mounted with respect to suspension assembly 530 with a yaw angle $\gamma$ in addition to a pitch angle $\alpha$ and/or a roll angle $\beta$.

It will be recognized that the present invention provides numerous benefits and advantages. For example, slider orientation can be controlled without an additional step of deforming a gimbal during manufacturing. This saves cost and preserves gimbal flexibility. Additionally, slider orientation can be controlled more precisely than by using the traditional technique of deforming the gimbal. Moreover, if there is a design change for a given slider mounting assembly requiring a new slider orientation, the new design can be achieved by simply changing slider pads on a single surface, such as the pads on the slider mounting surface. The changed orientation can also be achieved merely by changing volume of solder used between various pads. Still further, slider mounting assemblies having sliders of various yaw angles can be manufactured using a machine that does not actually place the slider at that yaw angle. Each of yaw angle $\gamma$, pitch angle $\alpha$ and roll angle $\beta$ can be selected over a range of possible angles in order to achieve the desired flying characteristics for the slider, and therefore to achieve the desired read/write performance of the areal bit density of the HDD. The selected angles can then be produced through the solder joints that connect the slider and the suspension.

Although the present invention has been described with reference to preferred embodiments, workers skilled in the art will recognize that changes may be made in form and detail without departing from the spirit and scope of the invention. For example, the number and location of bond pads could be varied while still utilizing the inventive design.

What is claimed is:

1. An assembly comprising:
    a slider comprising:
        an air bearing surface;
        a slider mounting surface opposite the air bearing surface; and
        a plurality of slider pads on the slider mounting surface;
    a suspension assembly comprising:
        a suspension mounting surface; and
        a plurality of suspension pads on the suspension mounting surface; and
    solder joints formed between each of the plurality of suspension pads and a corresponding one of the plurality of slider pads, wherein the solder joints connect the slider to the suspension and define at least one of a pitch angle of between about 0.5 degrees and about 5 degrees, a roll angle of between about 0.5 degrees and about 5 degrees, and a yaw angle of between about 0.5 degrees and about 20 degrees of the slider mounting surface with respect to the suspension mounting surface.

2. The assembly of claim 1, wherein the solder joints define at least one of the pitch angle, the roll angle, and the yaw angle based upon at least one of different pad sizes, different solder volumes, different pad shapes, and relative orientation of the suspension pads and the slider pads.

3. The assembly of claim 1, wherein at least one of the pitch angle and the roll angle is between about 0.5 degrees and about 3 degrees.

4. The assembly of claim 1, wherein at least one of the pitch angle and the roll angle is between about 0.5 degrees and about 1 degree.

5. The assembly of claim 1, wherein the pitch angle and the roll angle are each between about 0.5 degrees and about 5 degrees.

6. The assembly of claim 1, wherein the yaw angle is between about 1 degree and about 10 degrees.

7. The assembly of claim 1, wherein the yaw angle is between about 3 degrees and about 10 degrees.

8. The assembly of claim 1, wherein the slider mounting surface has a leading edge, wherein a pitch axis is substantially parallel to the leading edge, and wherein the pitch angle is defined about the pitch axis.

9. The assembly of claim 1, wherein the slider mounting surface has a leading edge and a trailing edge, wherein a roll axis is substantially perpendicular to both the leading edge and the trailing edge, and wherein the roll angle is defined about the roll axis.

10. The assembly of claim 1, wherein the plurality of slider pads comprise a first slider pad with a first slider pad surface area and a second slider pad with a second slider pad surface area wherein the second slider pad surface area is larger than the first slider pad surface area.

11. The assembly of claim 10, wherein the plurality of suspension pads comprise a first suspension pad with a first suspension pad surface area and a second suspension pad with a second suspension pad surface area, wherein the second suspension pad surface area is larger than the first suspension pad surface area, and wherein the first slider pad is soldered to the first suspension pad and the second slider pad is soldered to the second suspension pad.

12. The assembly of claim 11, wherein a distance between the first slider pad and the first suspension pad is greater than a distance between the second slider pad and the second suspension pad.

13. The assembly of claim 10, wherein the plurality of suspension pads comprise a first suspension pad soldered to the first slider pad and a second suspension pad soldered to the second slider pad, wherein a first distance is measured between the first slider pad and the first suspension pad and a second distance is measured between the second slider pad and the second suspension pad, and wherein each of the first and second distances are inverse functions of each of the first and second slider pad surface areas, respectively.

14. The assembly of claim 1, wherein the solder joints comprise a first solder joint and a second solder joint, wherein the first solder joint contains a greater volume of solder than the second solder joint.

15. The assembly of claim 14, wherein a distance between the slider mounting surface and the suspension mounting surface at the first solder joint is greater than a distance between the slider mounting surface and the suspension mounting surface at the second solder joint.

16. The assembly of claim 14, wherein the plurality of slider pads comprise a first slider pad and a second slider pad, wherein the plurality of suspension pads comprise a first suspension pad connected to the first slider pad by the first solder joint and a second suspension pad connected to the second slider pad by the second solder joint, wherein a first distance is measured between the first slider pad and the first suspension pad, wherein a second distance is measured between the second slider pad and the second suspension pad, and wherein each of the first and second distances are functions of the volume of solder in each of the first and second solder joints, respectively.

17. The assembly of claim 1, wherein each of the plurality of slider pads have different lengths in at least one direction than a corresponding one of the plurality of suspension pads to define the yaw angle.

18. The assembly of claim 1, wherein the slider mounting surface has a slider centerline axis bisecting the slider mounting surface, wherein the suspension mounting surface has a suspension centerline axis bisecting the suspension mounting surface, and wherein the yaw angle is defined as an angle between the slider centerline axis and the suspension centerline axis.

19. The assembly of claim 18, wherein the slider mounting surface has a leading edge and a trailing edge opposite the leading edge, wherein the slider centerline axis extends from approximately a midpoint of the leading edge to approximately a midpoint of the trailing edge, and wherein the suspension centerline axis extends along a length of the suspension.

20. The assembly of claim 18, wherein the plurality of slider pads define a plurality of slider pad center points arranged in a slider pad array, wherein the plurality of suspension pads define a plurality of suspension pad center points, and wherein the plurality of suspension pad center points are arranged in a suspension pad array that is substantially a mirror image of the slider pad array.

21. An assembly comprising:
a slider with an air bearing surface and a slider mounting surface opposite the air bearing surface, wherein the slider mounting surface comprises:
a plurality of slider pads on the slider mounting surface;
a leading edge connecting the slider mounting surface to the air bearing surface; and
a slider coordinate system defined by the slider comprising:
a slider x axis defined along the slider mounting surface, substantially bisecting the slider mounting surface, and perpendicular to the leading edge;
a slider y axis defined along the slider mounting surface and perpendicular to the slider z axis; and
a slider z axis perpendicular to both the slider z axis and the slider x axis;
a suspension assembly with a suspension mounting surface comprising:
a plurality of suspension pads on the suspension mounting surface; and
a suspension coordinate system defined by the suspension assembly comprising:
a suspension x axis defined along the suspension mounting surface, substantially bisecting the suspension mounting surface, and extending along a length of the suspension mounting surface;
a suspension y axis defined along the suspension mounting surface and perpendicular to the suspension z axis; and
a suspension z axis perpendicular to both the suspension z axis and the suspension x axis;
solder joints formed between each of the plurality of suspension pads and a corresponding one of the plurality of slider pads, wherein the solder joints connect the slider to the suspension assembly so that the slider coordinate system is rotated with respect to the suspension coordinate system by between about 0.5 degrees and about 20 degrees in reference to a particular axis selected from a group consisting of the suspension x axis, the suspension y axis, and the suspension z axis.

22. The assembly of claim 21, wherein the solder joints define at least one of a pitch angle, a roll angle, and a yaw angle based upon at least one of different pad sizes, different solder volumes, different pad shapes, and relative orientation of the suspension pads and the slider pads.

23. A method for mounting a slider, the method comprising:
providing a slider with a slider mounting surface comprising a first slider pad and a second slider pad;
providing a suspension assembly with a suspension mounting surface comprising a first suspension pad and a second suspension pad;
placing a first quantity of solder having a first volume between the first slider pad and the first suspension pad;
placing a second quantity of solder having a second volume between the second slider pad and the second suspension pad, wherein the first volume is greater than the second volume;
heating the first quantity of solder and the second quantity of solder to a liquid state; and
cooling the first quantity of solder and the second quantity of solder to a solid state, wherein the first quantity of solder creates a first electrical and mechanical bond between the first slider pad and the first suspension pad, wherein the second quantity of solder creates a second electrical and mechanical bond between the second slider pad and the second suspension pad, and wherein an angle between the slider mounting surface and the suspension mounting surface is between about 0.5 degrees and about 5 degrees after cooling.

24. The method of claim 23, and further comprising the step of:
selecting the first volume and the second volume so that the angle between the slider mounting surface and the suspension mounting surface is between about 0.5 degrees and about 3 degrees after cooling.

25. The method of claim 23, and further comprising the step of:
selecting the first volume and the second volume so that the angle between the slider mounting surface and the suspension mounting surface is between about 0.5 degrees and about 1 degree after cooling.

26. A method for attaching a slider to a suspension assembly, the method comprising:
providing a slider with a slider mounting surface comprising a first slider pad and a second slider pad, wherein the slider mounting surface defines a slider centerline axis perpendicular to a leading edge;
providing a suspension assembly with a suspension mounting surface comprising a first suspension pad and a second suspension pad, wherein the suspension mounting surface defines a suspension centerline axis substantially bisecting the suspension mounting surface and extending along a length of the suspension mounting surface;
aligning the slider in a first position with respect to the suspension assembly so that the slider mounting surface faces the suspension mounting surface, wherein the slider centerline axis and the suspension centerline axis form a first angle;
placing solder between the first slider pad and the first suspension pad and between the second slider pad and the second suspension pad;
heating the solder to a liquid state; and
solidifying the solder, wherein the slider is realigned to a second position with respect to the suspension assembly upon solidification of the solder, and wherein the slider centerline axis and the suspension centerline axis form a second angle after solidifying the solder, the second angle being more than 0.5 degrees different from the first angle.

27. The method of claim 26, wherein the second angle is between about 1 degrees and about 20 degrees different from the first angle.

28. The method of claim 26, wherein the second angle is between about 3 degrees and about 10 degrees different from the first angle.

29. The method of claim 26, wherein the first slider pad has a different length in at least one direction than the first suspension pad and the second slider pad has a different length in at least one direction than the second suspension pad.

30. The method of claim 26, wherein the first suspension pad is longer in at least one direction than the first slider pad and the second suspension pad is longer in at least one direction than the second slider pad.

31. The method of claim 26, wherein the slider is forced from the first position to the second position as a function of solder surface tension.

* * * * *